United States Patent [19] [11] Patent Number: 5,788,185
Hooper [45] Date of Patent: Aug. 4, 1998

[54] AIRCRAFT SEAT HAVING IMPROVED USER LUMBAR LOAD CHARACTERISTICS DURING A CRASH EVENT

[75] Inventor: Steven J. Hooper, Wichita, Kans.

[73] Assignee: Impact Dynamics, Inc., Wichita, Kans.

[21] Appl. No.: 649,575

[22] Filed: May 17, 1996

[51] Int. Cl.⁶ .................................................. B64D 11/00
[52] U.S. Cl. ........................... 244/122 R; 244/118.6; 248/598; 248/421; 297/216.1; 297/216.13; 297/216.15
[58] Field of Search ..................... 244/122 R, 118.6; 297/216.13, 216.1, 216.15; 248/548, 421, 157, 900

[56] References Cited

U.S. PATENT DOCUMENTS

| | | | |
|---|---|---|---|
| 2,933,127 | 4/1960 | Brewster | 244/122 R |
| 3,792,896 | 2/1974 | Eggert, Jr. | 297/216 |
| 4,349,167 | 9/1982 | Reilly | 244/122 R |
| 4,423,848 | 1/1984 | Mazelsky | 244/122 R |
| 4,440,441 | 4/1984 | Marrujo et al. | 297/216 |
| 4,712,834 | 12/1987 | Warrick | 244/122 R |
| 4,718,719 | 1/1988 | Brennan | 297/216 |
| 4,861,103 | 8/1989 | Vallee | 297/216 |
| 4,911,381 | 3/1990 | Cannon et al. | 244/122 R |
| 5,125,598 | 6/1992 | Fox | 244/122 R |
| 5,133,587 | 7/1992 | Hadden, Jr. | 297/146 |
| 5,152,578 | 10/1992 | Kiguchi | 244/122 R |
| 5,273,240 | 12/1993 | Sharon | 244/122 R |
| 5,320,308 | 6/1994 | Bilezikjian et al. | 297/216.1 |
| 5,335,882 | 8/1994 | Bonacci | 244/118.5 |
| 5,337,979 | 8/1994 | Bales et al. | 244/122 R |
| 5,338,090 | 8/1994 | Simpson et al. | 297/216.2 |
| 5,340,059 | 8/1994 | Kanigowski | 244/121 |
| 5,344,210 | 9/1994 | Marwan et al. | 297/216.2 |
| 5,351,791 | 10/1994 | Rosenweig | 188/372 |
| 5,531,404 | 7/1996 | Marechal | 244/122 R |

Primary Examiner—Robert J. Oberleitner
Assistant Examiner—Tien Dinh
Attorney, Agent, or Firm—Head, Johnson & Kachigian

[57] ABSTRACT

A seat for use in an aircraft providing improved user lumbar load characteristics during a crash event, the seat having a pair of spaced apart front and rear legs, the front and rear legs each being formed of a metallic curved beam having high plastic and low elastic deformation characteristics. First and second chair beams are connected between the front and rear legs. A seat pan is supported between the chair beams, the seat pan being configured to plastically and telescopically deform downwardly between the front and rear legs during a crash event. An energy absorbing seat cushion is positioned on the seat pan. Drag links limit the forward displacement of the front legs upper ends and thereby the seat pan during a crash event. The plasticity of the chair legs, the seat pan and the seat cushion being selected such that in the event of a crash a substantial portion of the load that would otherwise be imparted to a passenger's lower back is absorbed.

20 Claims, 5 Drawing Sheets

AIRCRAFT SEAT HAVING IMPROVED USER LUMBAR LOAD CHARACTERISTICS DURING A CRASH EVENT

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

This invention relates to seats for use in an aircraft having improved energy absorbing characteristics to substantially reduce the load applied to the lumbar portion of the anatomy of a user positioned on the seat in the event of a crash of the aircraft in which the seat is employed.

DESCRIPTION OF THE PRIOR ART

Aircraft manufacturers and airline operators have long been and continue to be concerned about the safety of passengers. Continuous studies have been made to determine improvements in passenger safety and ways of increasing the chances of survival of accidents. In survivable accidents, the airplane structure typically remains substantially in tact and provides an area wherein occupants have a high chance of survival. However, studies have indicated that a frequent cause of death and injury in a survivable aircraft crash is the exceedingly high load applied to the lower backbone portion of the anatomy of aircraft passengers. For this reason, studies have been made to provide improved aircraft seats designed to reduce the load applied to a passenger in the event of a survivable aircraft crash.

Others have given consideration to the construction of aircraft seats that are intended to diminish the possibility of death or injury to passengers occurring as a result of a survivable aircraft crash. For reference to background material indicative of the state of the art and exemplary of the efforts of others to improve aircraft seat characteristics, reference may be had to the following United States patents:

| U.S. PAT. NO. | INVENTOR | TITLE |
|---|---|---|
| 3,792,896 | Eggert, Jr. | Crash Attenuation Apparatus For A Seat In A Vehicle |
| 4,423,848 | Mazelsy | Crashworthy Helicopter Seat |
| 4,440,441 | Marrujo et al | Energy Attenuating Seat And Leg Therefor |
| 4,718,719 | Brennan | Energy Absorbing Aircraft Seat Frame Structure |
| 4,861,103 | Vallee | Structure Forming A Mounting For A Seat Of An Air Transport Craft |
| 4,911,381 | Cannon et al | Energy-Absorbing Leg Assembly For Aircraft Passenger Seats |
| 5,125,598 | Fox | Pivoting Energy Attenuating Seat |
| 5,133,587 | Hadden, Jr. | Seat |
| 5,152,578 | Kiguchi | Leg Structure Of Seat For Absorbing Impact Energy |
| 5,273,240 | Sharon | Impact Absorption System, Particularly For Aircraft Seats |
| 5,282,665 | Beroth | Passenger Seat And Passenger Seat Leg Assembly With Energy Absorbing Zone Including Auxiliary Crush-Resisting Means |
| 5,338,090 | Simpson et al | Leg Structure of Seat For Absorbing Impact Energy |
| 5,340,059 | Kanigowski | Energy Absorbing Cabinet For Aircraft Bulkheads |
| 5,344,210 | Marwan et al | Energy-Absorbing Device, Structure Forming A Mounting For An Aircraft Seat Having Such A Device, And Seat Having Such A Structure |
| 5,351,791 | Rosenzweig | Device And Method For Absorbing Impact Energy |

BRIEF SUMMARY OF THE INVENTION

An improved seat is provided for use in an aircraft, the aircraft having a floor with conventional seat attachment points. The seat provides improved users safety in the event of a crash and particularly provides reduced load to a user's back lumbar section so as to thereby reduce injuries and deaths.

The seat includes a pair of first and second spaced apart front legs. Each of the legs has an upper end and a lower end. The lower ends are affixed to the aircraft seat attachment points at the floor level. In the preferred arrangement, the lower ends are pivotally attached to the aircraft seat attachment points.

The front legs are each in the form of an integral curved metal beam that, in elevational view, is of S-shaped or horizontal V-shaped configuration. The curved beam front legs are designed to plastically deform in response to the load applied as a vector having a major vertical, downward component and a minor forward, horizontal component. Further, the front legs are each configured so that portions of the S-shaped or horizontal V-shaped configuration collapse into each other in a crash event before a strain level is reached that would result in rupture of the leg.

The seat further includes a pair of first and second spaced apart rear legs each having an upper and a lower end with the lower ends being attached to the aircraft seat attachment points at the floor level.

Each of the rear legs is formed of an integral metallic curved beam that, in a vertical profile is either of an S-shaped or V-shaped configuration. By "horizontal V-shaped" is meant a V-shape turned 90° from a vertical axis or a V-shape wherein the V is lying on its side. The rear legs are configured to have high plastic and low elastic deformation characteristics and are formed so that the portions of the S-shaped or horizontal V-shaped legs will plastically collapse upon themselves prior to rupture of the legs.

A first chair beam is connected between the first front leg upper end and the first rear leg upper end. In like manner, a second spaced apart and generally paralleled chair beam is connected between the second front leg upper end and the second rear leg upper end.

A seat pan of generally planar construction has an upper surface and opposed first and second side edges. The side edges are attached to the first and second chair beams or a combination of these materials. The seat pan is formed of a material such as metal, fiberglass or plastic, and is configured to plastically deform in response to the weight of a user in a crash event. By "user" is meant an aircraft crew member or passenger.

The chair legs and seat pan are designed so that in a crash event, with a user seated on the seat pan, the seat pan will plastically and telescopically deform downwardly between the pairs of front and rear legs.

An energy absorbing seat cushion is positioned on the seat pan.

A pair of drag struts is affixed to limit the forward displacement of the upper ends of the front legs and thereby the seat pan. Each drag strut has a lower end that is attached to a floor seat attachment point, which may be at the same point of attachment as a rear leg lower end. The forward ends of the drag struts are attached to the chair beam adjacent to or coincident with the point where the front leg upper ends attach to the chair beam. The function of the drag struts is to limit the forward displacement of the seat, particularly the seat pan and to guide the seat pan slightly forwardly but primarily downwardly in the event of a crash.

A more complete understanding of the invention will be obtained from the following description of the preferred embodiments, taken in conjunction with the attached drawings.

DESCRIPTION OF THE DRAWINGS

FIG. 1 is an elevational side view of a seat for use in an aircraft incorporating the principles of this invention. FIG. 1 shows the seat without padding or cushions.

DETAILED DESCRIPTION OF THE PREFERRED EMBODIMENTS

Figure 1:
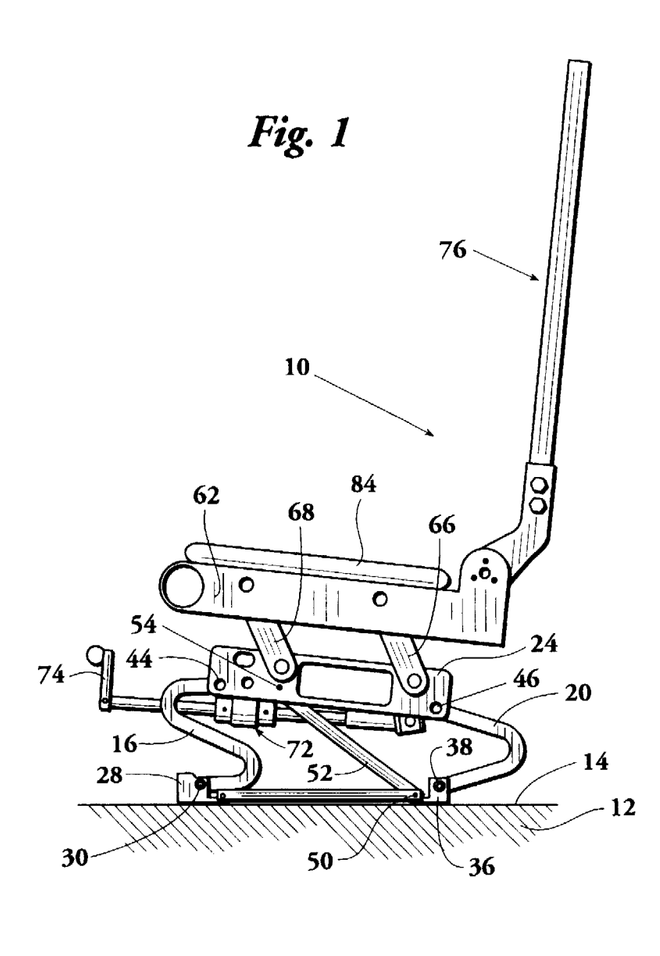
Figure 3:
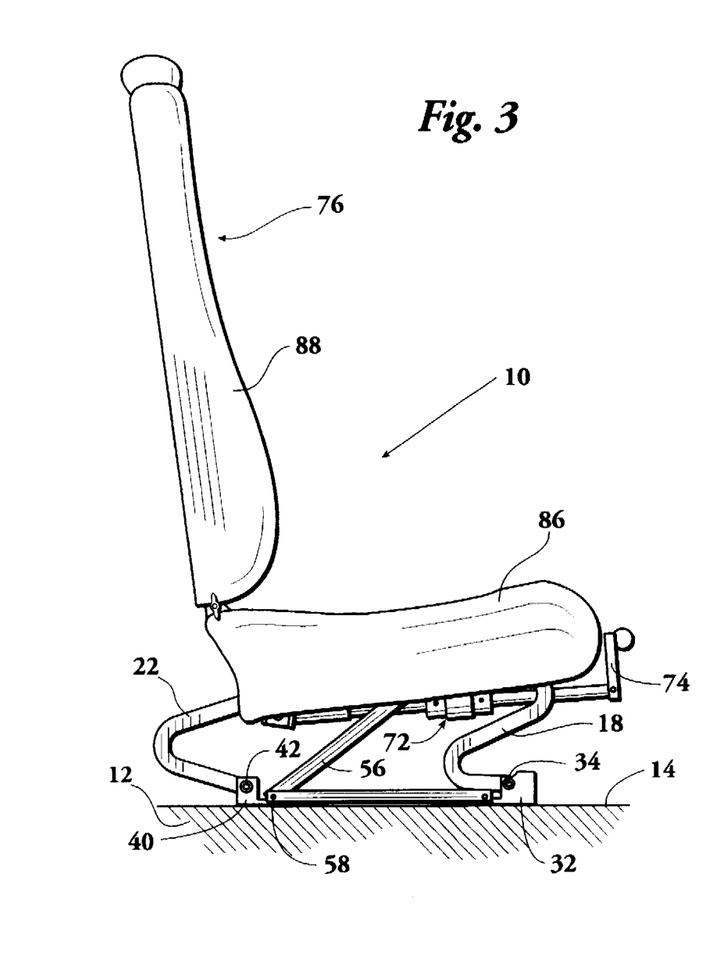
FIG. 3 is a side elevational view of the seat of FIG. 1, shown facing in the opposite direction, and with typical upholstery as the seat would look when ready to be occupied.

Referring to the drawings and first to FIGS. 1 and 3, an aircraft seat that employs the principles of this invention is illustrated, the seat being generally indicated by the numeral 10.

Conventional floor seat mounting attachment structure is indicated by the numeral 12 at floor surface 14.

Seat 10 includes first and second spaced apart front legs 16 and 18 and first and second spaced apart rear legs 20 and 22. A first chair beam 24 is supported between front leg 16 and rear leg 20 and, in like manner, a second chair beam 26 is supported between front leg 18 and rear leg 22.

First front leg 16 has a lower end that is supported to seat mounting attachment structure 12 at floor 14. In the illustrated arrangement, the lower end of first leg 16 is supported to a floor bracket 28 and, preferably first leg 16 is fixed to pivot with respect to floor bracket 28 by means of a pin 30. A second floor bracket 32 and pin 34 pivotally supports the lower end of second front leg 18.

In like manner, the lower end of first rear leg 20 is supported to aircraft seat mounting attachment structure by means of bracket 36 and pin 38. Second rear leg 22 is supported by bracket 40 and pin 42.

Figure 2:
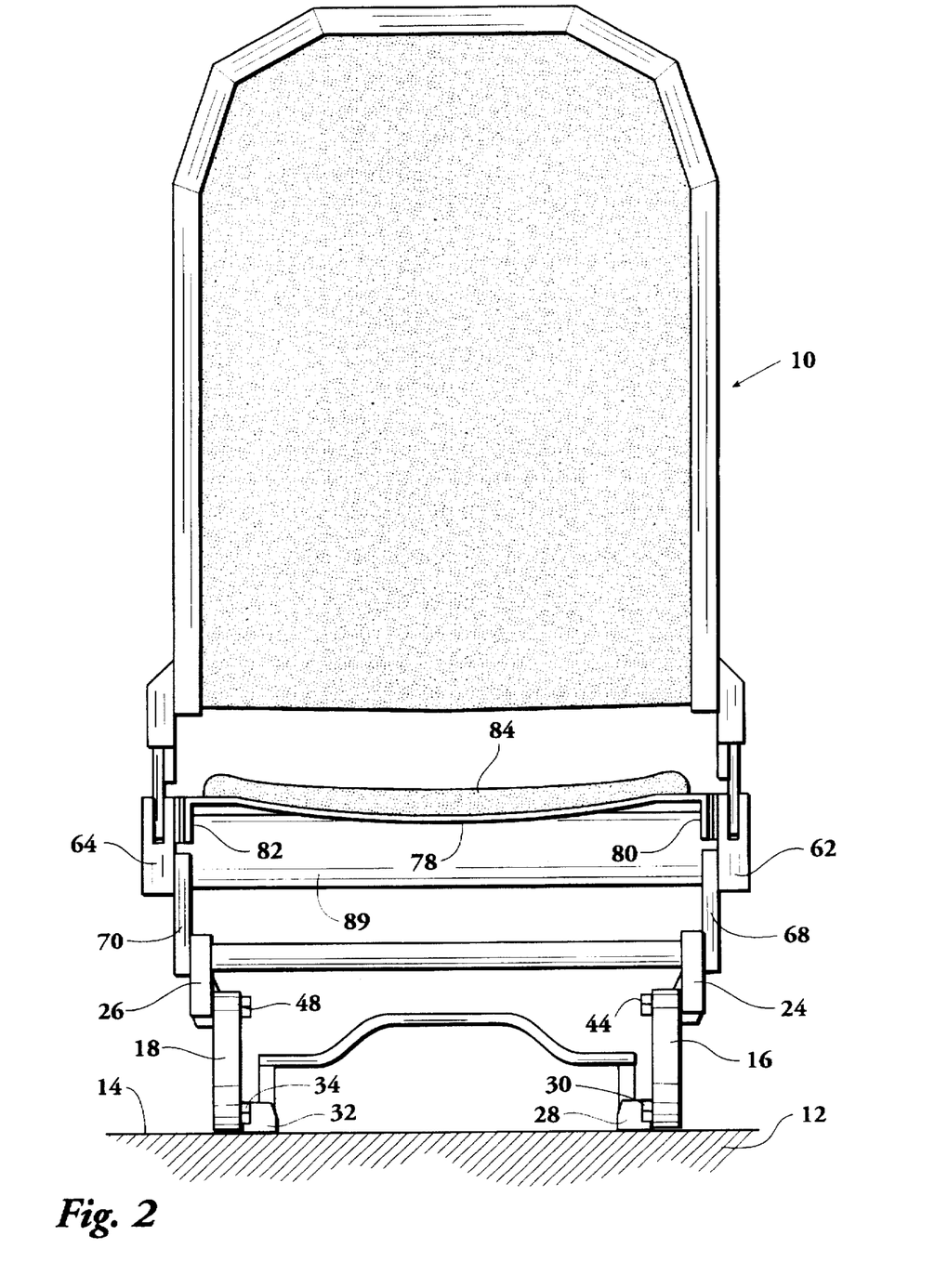
FIG. 2 is a front elevational view of the seat of FIG. 1.

The upper end of first front leg 16 is supported to first chair beam 24, such as by means of pin 44, while the upper end of first rear leg 20 is supported to beam 24 by pin 46. In similar way, second front and second rear legs 18 and 22 are pivotally supported to second chair beam 26, only pin 48 being seen in FIG. 2.

Pivotally connected at its lower end, about pin 50 to bracket 36, is a first drag strut 52. The upper end of drag strut 52 is connected to first chair beam 24 by pin 54. In like manner, a second drag strut 56 is connected at its lower end by pin 58 to bracket 40 and the upper end is pivotally connected (not seen) to second chair beam 26.

The function of drag struts 52 and 56 is to control the interrelationship of the legs, chair and beams. In a crash event, the legs undergo plastic deformation, in a manner to be described subsequently, allowing the chair to move forwardly and downwardly as pivotally controlled by struts 52 and 56.

The seat, as illustrated in FIGS. 1 and 3, provides for height adjustment. This is obtained by the use of upper chair beams 62 and 64 that extend generally parallel to and above chair beams 24 and 26. Upper chair beam 62 is supported to and above chair beam 24 by means of linkages 66 and 68. In a similar manner, the opposite upper chair beam 64 is supported by linkages, only linkage 70 may be seen in FIG. 2. The function of linkages 66 and 68 is to permit the height of seat 10 to be adjusted using a height adjustment mechanism generally indicated in numeral 72. Height adjustment mechanism 72 is merely exemplary of the environment in which the unique aspects of the chair of this invention may be employed. Height adjustment mechanism 72 includes a crank arm 74 by which the height is adjusted. Mechanism 72 and crank arm 74 are known devices as used in the aircraft seat art and are within the knowledge of any engineer skilled in the design and construction of aircraft seats and therefore are not illustrated in detail herein. FIGS. 1 and 3 show generally the height adjustment mechanism 72 and crank arm 74, but these elements are not shown in FIG. 2.

Supported to a rearward portion of upper side beams 62 and 64 is a seat back 76 which may be of standard construction.

Figure 4:
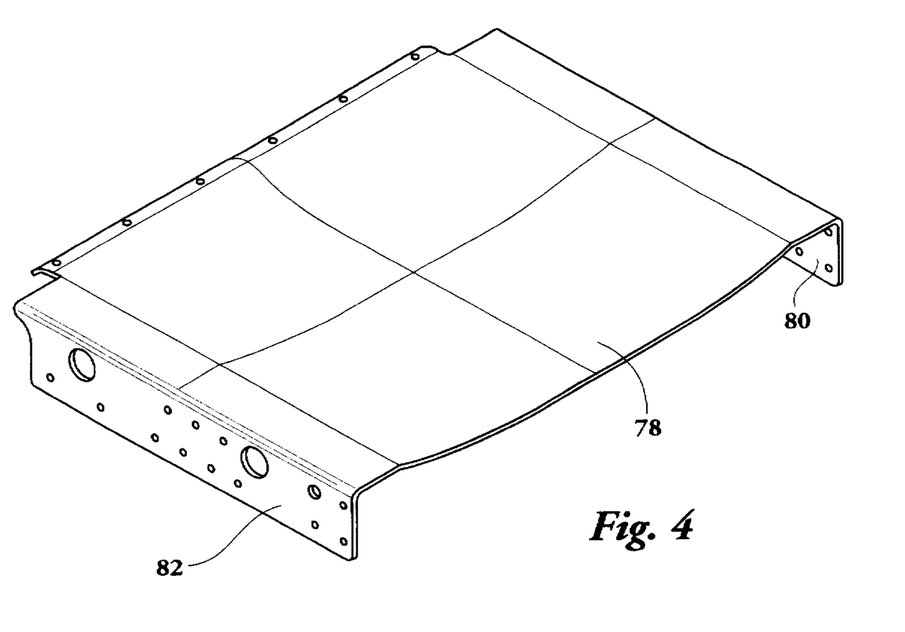
FIG. 4 is an isometric view of the seat pan as used in FIGS. 1 through 3.

Positioned between upper chair side beams 62 and 64 is seat pan 78. As seen in FIG. 4, seat pan 78 has integral downwardly extending edges 80 and 82 that are secured to upper chair beams 62 and 64 respectively.

Positioned on seat pan 78 is an energy-absorbing, seat cushion 84. Seat cushion 84 is preferably made of a cellular plastic material having a high degree of plasticity and low resilience. Such material is substantially stiff and inflexible when the normal weight of an individual is placed on it, therefore, seat pad 84 is not employed to add comfort to the user but is employed for shock absorption. For that reason, a more resilient cushion (not shown) such as a sponge rubber will be positioned on top of seat pad 84 in the commercial embodiment of the invention. The completed chair will include seat upholstery 86 and back upholstery 88 as seen in FIG. 3, however, upholsteries 86 and 88 are not germane to the critical aspects of the invention and are not critical to the issue of providing improved user lumbar load characteristics during a crash event.

Seat pan 78 is formed of metal, plastic, fiberglass, composites or laminates of these materials, seat pan 78 deforms plastically, that is, without significant elasticity, under crash event conditions. Seat cushion 84, when combined with seat pan 78 and the four legs, 16, 18, 20, and 22 cooperatively functions as an integral part of a system to achieve improved energy absorption during crash conditions so that the total lumbar load applied to the user is within the limits necessary to substantially reduce the possibility of serious injury or death. These structures are arranged to cause seat pan 78, with cushion 84 to telescopically deform downward so that the seat pan telescopes between the opposed legs.

Figure 5:
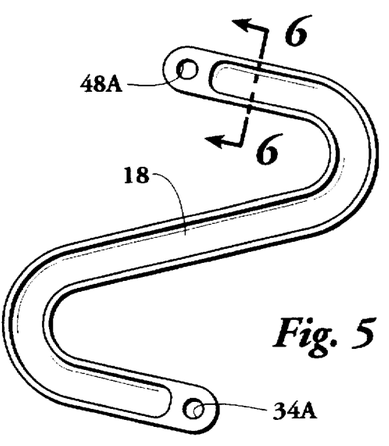
FIG. 5 is an elevational, enlarged view of an S-shaped leg of an aircraft seat according to this invention. The S-shaped leg of FIG. 5 may be employed as a front or a rear leg.

FIG. 5 is an elevational view of an aircraft seat leg according to the principals of this invention. The leg illustrated in FIG. 5 may be used as a front leg or rear leg however, FIGS. 1, 2, 3, 9 and 10 show this S-shaped leg used as a front leg. Leg 18 is of S-shaped construction and provides an opening 34A at the lower end to receive a pin 34 as seen in FIG. 3, and an opening 48A at the upper end to receive a pin (not seen) by which the upper end of leg 18 is pivotally attached to second chair beam 26.

Figure 6:
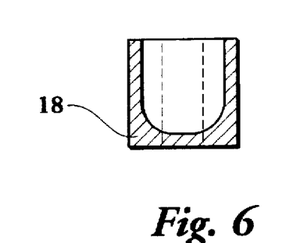
FIG. 6 is an enlarged cross-sectional view of an S-shaped leg as taken along the line 6—6 of FIG. 5.

FIG. 6 shows a typical cross-sectional view of S-shaped leg 18. Leg 18 is integrally formed of a metallic material having a high degree of plasticity but low resilience. That is, upon the application of force in which the upper end adjacent 48A is moved towards the lower end adjacent 34A, the leg collapses upon itself plastically, that is, with minimal rebounding. As shown in FIG. 6, the leg main body portion is of generally rectangular external configuration with a U-shaped interior. This design achieves the desired characteristic of this invention, that is, the leg 18 will collapse upon itself before catastrophic failure—that is, the leg will completely collapse without breaking.

Figure 7:
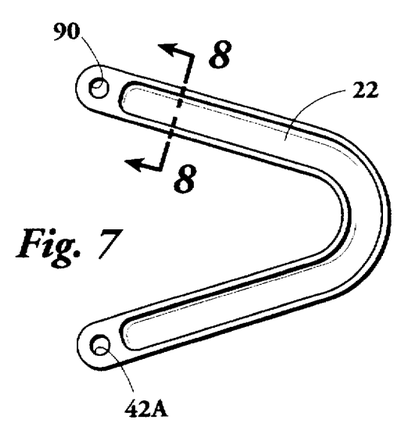
FIG. 7 is an enlarged elevational view of a horizontal V-shaped leg of an aircraft seat of this invention. The horizontal V-shaped leg of FIG. 7 may be used as a front or rear leg.
Figure 8:
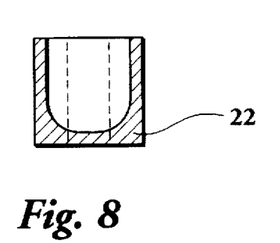
FIG. 8 is an enlarged cross-sectional view of the horizontal V-shaped leg taken along the line 8—8 of FIG. 7.

FIG. 7 shows a seat leg of a horizontal V-shape identified by the numeral 22. The horizontal V-shaped leg 22 (which may also be described as in the shape of a V lying on its side) can be employed as a front chair leg or a rear chair leg. FIGS. 1, 3, 9 and 10 show horizontal V-shaped legs used as the seat rear legs but this is by example only. Leg 22 is shown with an opening 42A at the leg lower end to receive pin 42 as seen in FIG. 3. At the upper end there is an opening 90 to receive a pin (not seen) by which the upper end of leg 22 is pivotally connected to second chair beam 26. Leg 22 is configured so that it will plastically deform upon itself completely without catastrophic failure, that is, without breaking. Both the S-shaped and the horizontal V-shaped legs have the characteristic of maximum plastic deformation with minimal possibility of catastrophic failure. When combined with the plastic deformability of seat pan 78, a synergistic relationship is achieved that has the capability of maximizing the sudden deceleration of the body of a user, (either aircraft crew or passenger) when a crash occurs.

The deceleration vector force applied to a chair by the body of a user during a crash event is composed of vertical and horizontal components. It has been learned that it is the downward, vertical components of the vector forces of deceleration that are most likely to produce injury or death to an aircraft seat user. The chairs of FIGS. 2 and 3 and FIGS. 9 and 10 are arranged to emphasize downward vertical vector force deceleration during a crash event.

A review of the features of the aircraft seat as described and illustrated indicates that the seat utilizes all of the available space between the seat pan 78 and floor 14 in that the seat pan telescopes into the space between the chair legs. In the practical embodiment of the invention, the chair legs will be designed, by the application of standard engineering technology, to prevent the lumbar load of an anthropomorphic test dummy from exceeding 1500 pounds. The geometries of the chair legs are such as to maximize the plastic zone of deformation and to minimize resiliency, that is, spring back, since elastic deformation reduces energy absorption. The legs are configured to respond to loads in both the vertical and horizontal, that is, fore and aft direction, however, the employment of drag struts 52 and 56 concentrate the vector force in the downward direction, that is, the motion of the seat in the fore and aft direction is limited by the drag struts but motion of the seat in the downward direction is not limited by the drag struts. Since the legs are configured to plastically deform upon themselves without catastrophic failure, rubber-like material (not shown) may be used to cushion the contact of the leg portions with each other.

Figure 9:
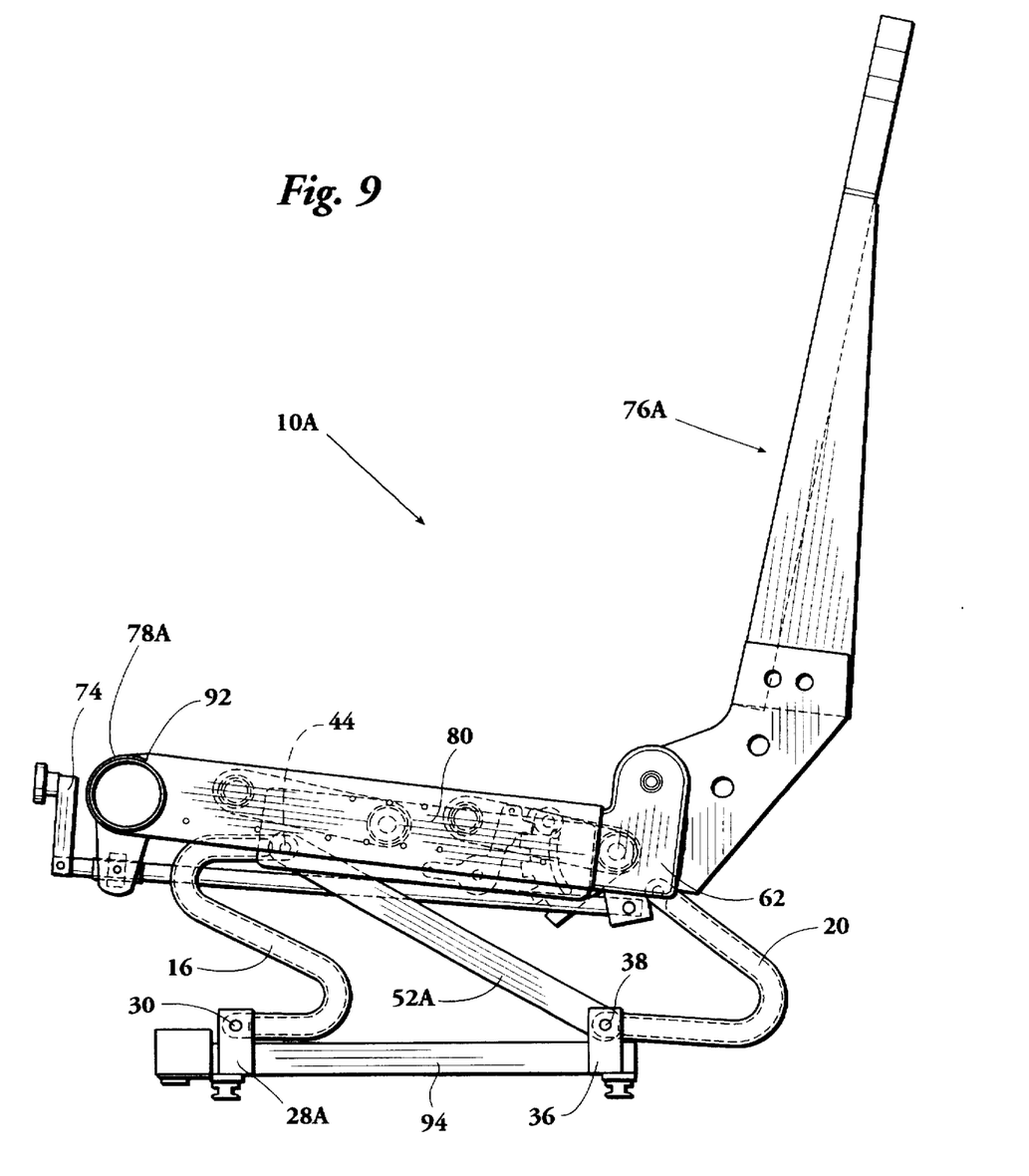
FIG. 9 is an elevational view of an alternate embodiment of a seat of this invention for use in an aircraft in which a seat height adjustment mechanism is set for a minimum height.

FIG. 9 illustrates an elevational side view of a slightly modified embodiment of the invention. The seat back 76A is strengthened compared to the earlier views. A more important difference however is that drag strut 52A is connected directly between pin 38 that supports the lower end of rear leg 20 and pin 44 that supports the upper end of front leg 16. By placing drag strut 50A in this position, mechanical force is directly connected between the lower end of the rear leg to the forward end of the front leg so that in a crash condition the strut limits the forward movement of the chair seat and guides the downward displacement of the chair seat in response to the rapid deceleration caused by a crash as the chair legs plastically deform.

A preferred means of constructing the seat includes the use of a cylindrical front beam 92 that is affixed at each end between the front ends of upper chair beams 62 and 64. The seat pan forward edge 78A laps over cylindrical beam 92. While seat pan 78 has been described as being supported between upper chair beams 62 and 64, the seat pan 78 can easily as well be supported between cylindrical front beam 92 and a rear beam (not seen) that extends between the upper chair beam 62 and 64.

Figure 10:
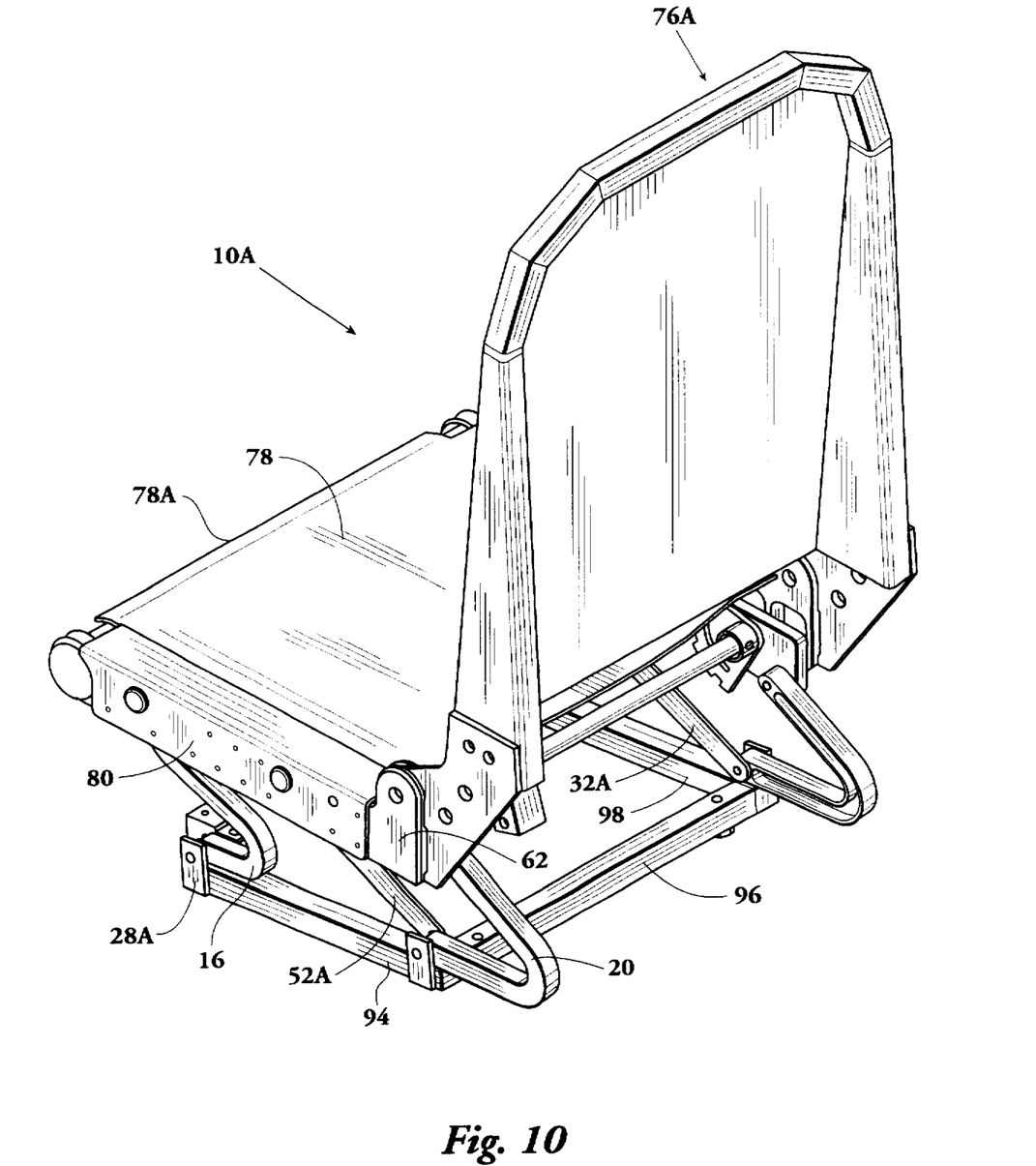
FIG. 10 is an isometric rear view of the seat of FIG. 9.

FIG. 10 shows an elevational isometric view slightly rearwardly of the chair as seen in FIG. 9.

The lower ends of the front and rear chair legs may be supported by structural members 94, 96 and 98 as seen in FIG. 10, only member 94 being seen in FIG. 9. However, these structural members are by way of example only and are not involved in reducing the user lumbar load characteristics of the seat during a crash event and therefore such structural members may or not be employed or the seat could be supplied with a different kind of base mechanism to which the lower ends of the front and rear energy absorbing legs are attached.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A seat for use in an aircraft having a conventional floor-mounted attachment points, the seat providing improved user lumbar load characteristics during a crash event, comprising:

a pair of first and second spaced apart front legs each having an upper and a lower end with means for attaching the lower ends to the aircraft floor-mounted attachment points;

a pair of first and second spaced apart rear legs each having an upper and a lower end with means for attaching the lower ends to the aircraft floor-mounted attachment points, each of said front seat legs and said rear seat legs being formed of a metallic curved beam having high plastic and low elastic deformation characteristics;

a first chair beam connected between said first front leg upper end and said first rear leg upper end;

a second chair beam connected between said second front leg upper end and said second rear leg upper end;

a seat pan of generally planar construction and having an upper surface and opposed first and second side edges that are supported respectively to said first and second chair beams, the seat being configured so that the pan is plastically and telescopically downwardly displaced between pairs of front and rear legs being configured so that the legs plastically deform upon themselves during a crash event; and at least one drag strut affixed to limit the forward displacement of said front legs upper ends and thereby said seat pan relative to said aircraft floor mounted attachment points during a crash event.

2. An aircraft seat according to claim 1 including:

an energy absorbing seat cushion positioned on said seat pan.

3. An aircraft seat according to claim 1 wherein each of said legs is in the form of an integral metal bar of, in elevational view, one of S-shaped or V-shaped configuration.

4. An aircraft seat according to claim 3 wherein each of said front legs is in S-shaped configuration and each of said rear legs is of horizontal V-shaped configuration.

5. An aircraft seat according to claim 1 wherein each said front leg is pivotally secured at its upper end to a said chair beam and pivotally secured at its said lower end to a floor mounted attachment point.

6. An aircraft seat according to claim 1 wherein each of said front and rear legs is formed of generally U-shaped cross-sectional configuration.

7. An aircraft seat according to claim 1 in which, during a crash event, said front and rear legs deform plastically at a load which prevents the lumbar load of an anthropomorphic test dummy from exceeding 1500 pounds during a simulated crash event.

8. An aircraft seat according to claim 1 in which said front and rear legs are configured to plastically deform in response to a load applied as a vector having downward vertical and forward horizontal components.

9. An aircraft seat according to claim 8 in which said downward vertical component is predominant.

10. An aircraft seat according to claim 1 wherein said pairs of front and rear legs are each configured so that portions of said legs collapse into each other in a crash event before a strain level is reached that would produce a leg failure.

11. A seat for use by a passenger in an aircraft having conventional floor mounted seat attachment points, the seat providing improved user lumbar load characteristics during a crash event, comprising:

a pair of first and second spaced apart front legs each having an upper end and a lower end and means of attaching the lower ends to the aircraft floor mounted seat attachment points, each front leg being in the form of an integral metal bar formed in one of a planar S-shape or V-shaped configured to have high plastic and low elastic deformation during a crash event;

a pair of first and second spaced apart rear legs each having an upper and a lower end and means of attaching the lower ends to the seat attachment points, each rear leg being in the form of an integral metal bar formed, in elevational orientation, in an S-shape or V-shape and configured to having high plastic and low elastic deformation during a crash event;

a first chair beam connected between said first front leg upper end and said first rear leg upper end;

a second chair beam connected between said second front leg upper end and said second rear leg upper end;

a seat pan having an upper surface and opposed first and second side edges that are supported respectively to said first and second chair beam, the seat pan being configured to plastically and telescopically deform downwardly between said pairs of front and rear legs during a crash event;

at least one drag strut affixed to limit the forward displacement of said front leg upper ends and thereby said seat pan relative to said aircraft floor mounted attachment points; and an energy absorbing low elastic seat cushion positioned on said seat pan top surface, the plasticity of said legs, seat pan and seat cushion cooperatively combining to reduce the lumbar load on a passenger during a crash event.

12. A seat for use in an aircraft having a conventional floor-mounted attachment points, the seat providing improved user lumbar load characteristics during a crash event, comprising:

a pair of first and second spaced apart front legs each having an upper and a lower end with means for attaching the lower ends to the aircraft floor-mounted attachment points;

a pair of first and second spaced apart rear legs each having an upper and a lower end with means for attaching the lower ends to the aircraft floor-mounted attachment points;

a first chair beam connected between said first front leg upper end and said first rear leg upper end;

a second chair beam connected between said second front leg upper end and said second rear leg upper end;

at least one drag strut affixed to limit the forward displacement of said front legs upper ends and thereby said seat pan relative to said aircraft floor mounted attachment points during a crash event; and a seat pan having an upper surface and opposed first and second side edges that are supported respectively to said first and second chair beams, each of said front legs and rear legs being in the form of an integral metal bar of, in elevational view, one of S-shaped or V-shaped configuration and providing high plastic and low elastic deformation characteristics.

13. An aircraft seat according to claim 12 wherein each of said front legs is of S-shaped configuration and each of said rear legs is of V-shaped configuration.

14. An aircraft seat according to claim 12 wherein each said legs is pivotally secured at its upper end to a said chair beam and pivotally secured at its said lower end to a floor mounted attachment point.

15. An aircraft seat according to claim 12 wherein each of said legs is formed of generally U-shaped cross-sectional configuration.

16. An aircraft seat according to claim 12 in which, during a crash event, said legs deform plastically at a load which prevents the lumbar load of an anthropomorphic test dummy from exceeding 1500 pounds during a simulated crash event.

17. An aircraft seat according to claim 12 in which said legs are configured to plastically deform in response to a load applied as a vector having downward vertical and forward horizontal components.

18. An aircraft seat according to claim 17 in which said downward vertical component is predominant.

19. An aircraft seat according to claim 12 wherein said pairs of front and rear legs are each configured so that portions of said legs collapse into each other in a crash event before a strain level is reached that would produce a leg failure.

20. An aircraft seat according to claim 12 including:
an energy absorbing seat cushion positioned on said seat pan.

* * * * *